Figure 1:
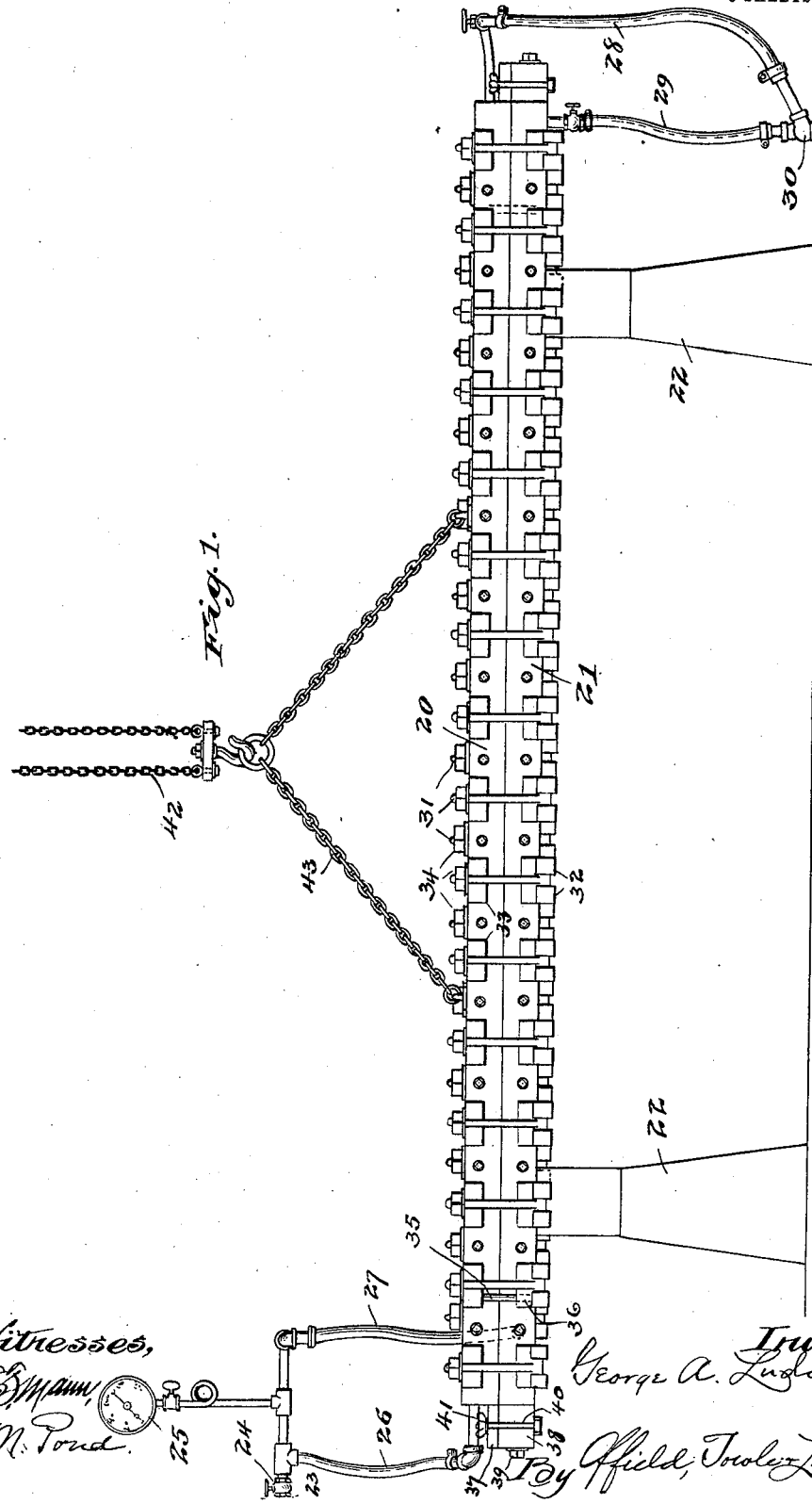

No. 754,078. PATENTED MAR. 8, 1904.
G. A. LUDINGTON.
METHOD OF VULCANIZING TIRES IN CONTINUOUS LENGTHS.
APPLICATION FILED JAN. 2, 1904.
NO MODEL. 5 SHEETS—SHEET 1.

Witnesses,
Inventor,
George A. Ludington,

No. 754,078. PATENTED MAR. 8, 1904.
G. A. LUDINGTON.
METHOD OF VULCANIZING TIRES IN CONTINUOUS LENGTHS.
APPLICATION FILED JAN. 2, 1904.
NO MODEL. 5 SHEETS—SHEET 2.

No. 754,078. PATENTED MAR. 8, 1904.
G. A. LUDINGTON.
METHOD OF VULCANIZING TIRES IN CONTINUOUS LENGTHS.
APPLICATION FILED JAN. 2, 1904.
NO MODEL. 5 SHEETS—SHEET 3.
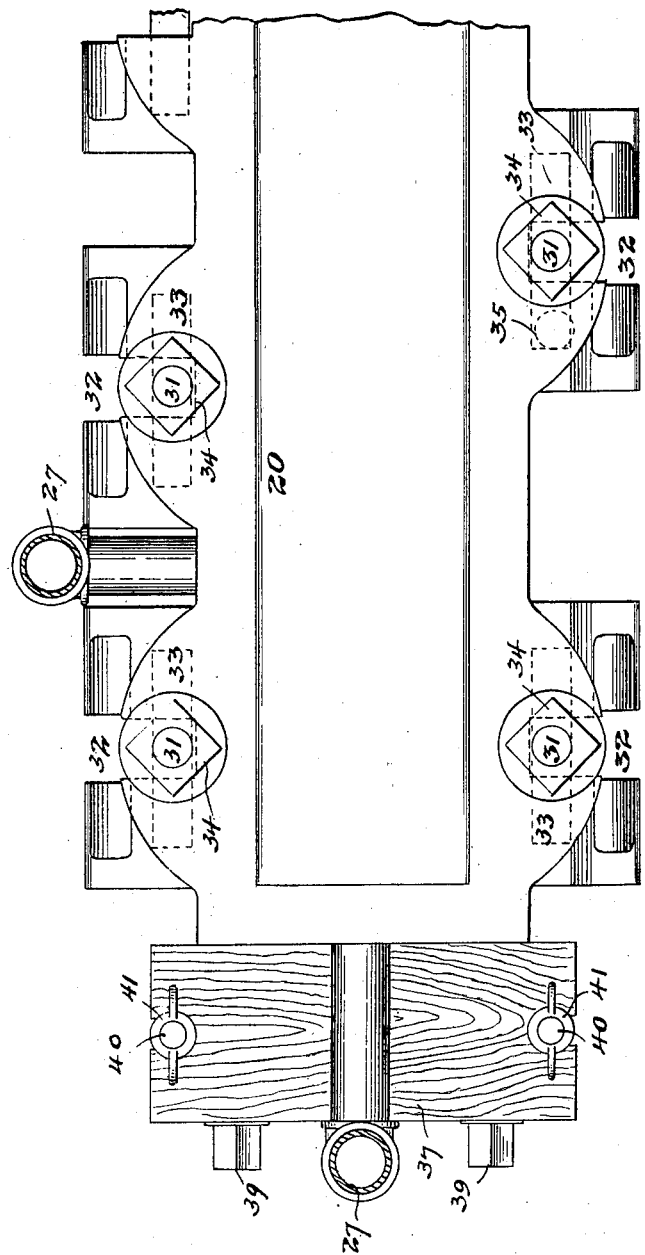

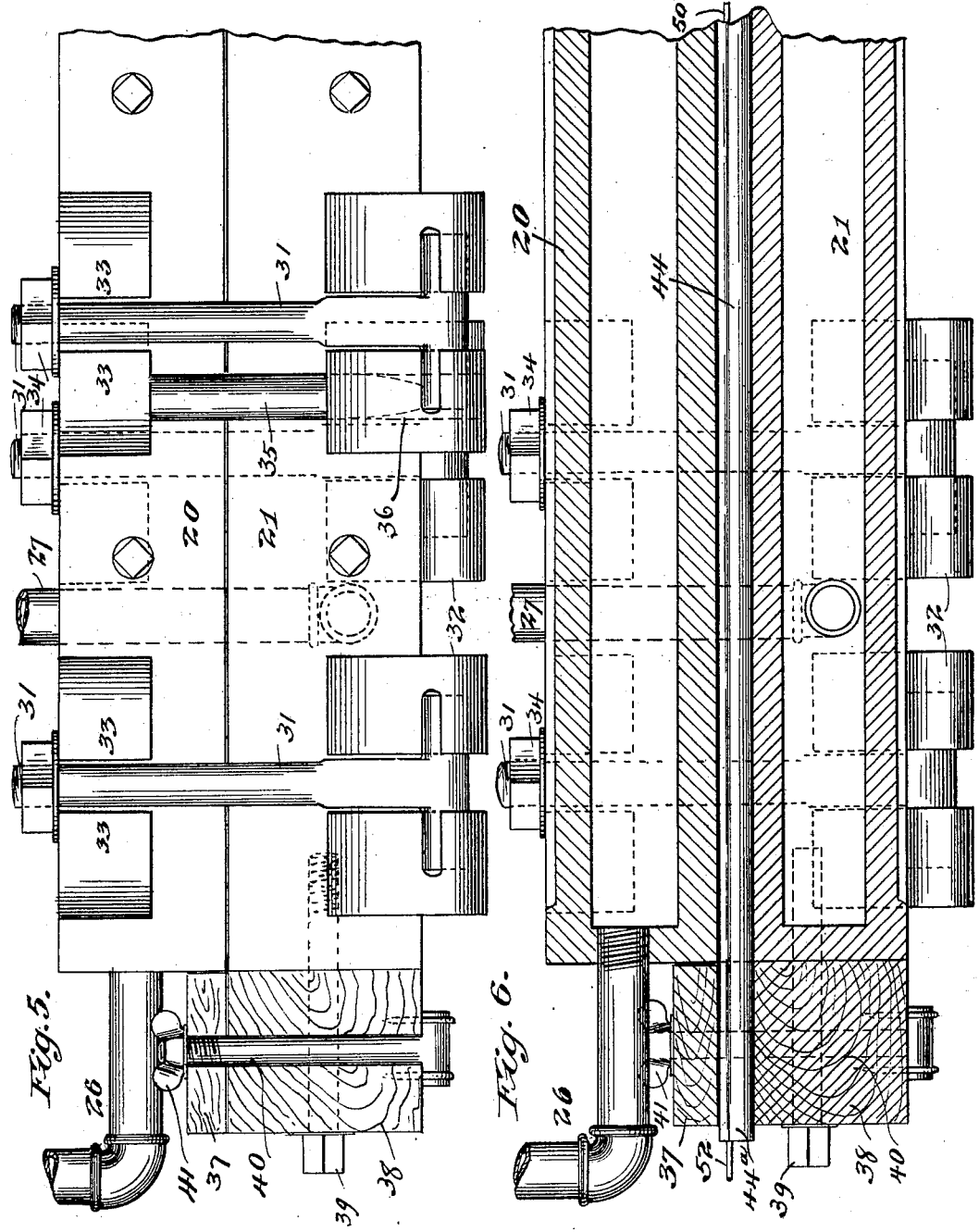

No. 754,078. PATENTED MAR. 8, 1904.
G. A. LUDINGTON.
METHOD OF VULCANIZING TIRES IN CONTINUOUS LENGTHS.
APPLICATION FILED JAN. 2, 1904.
NO MODEL. 5 SHEETS—SHEET 5.
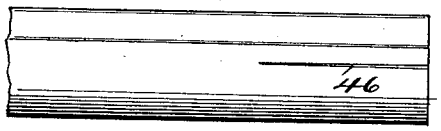
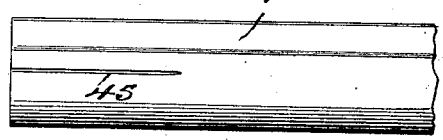
Fig. 7.
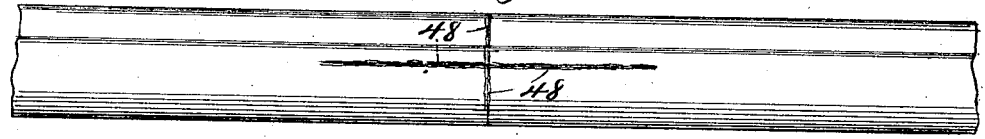
Fig. 8.
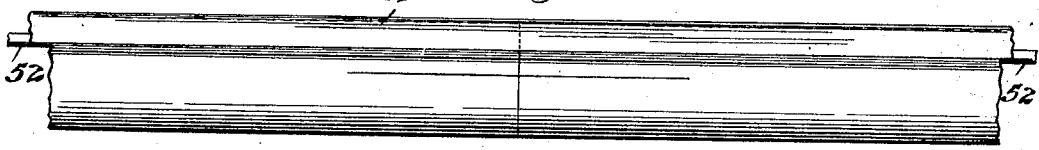
Fig. 9.
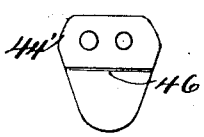
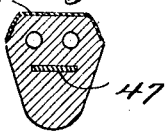
Fig. 10. Fig. 12. Fig. 11.
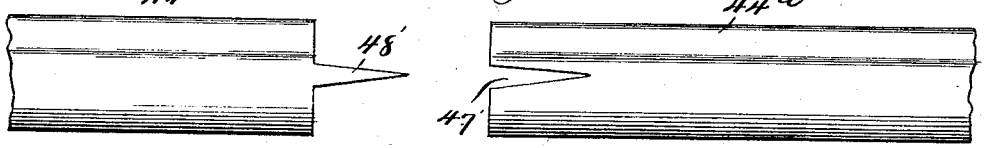
Fig. 13.
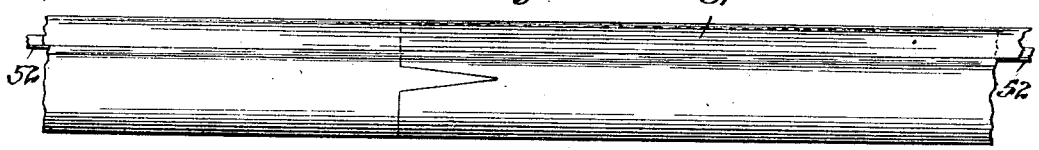
Fig. 14.
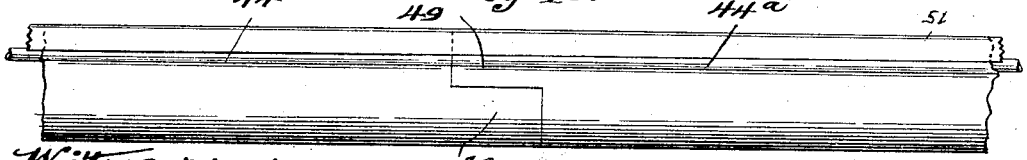
Fig. 15.
Witnesses,
F. D. Mann,
S. N. Pond.
Inventor,
George A. Ludington,
By Offield, Towle & Linthicum
Attys.

No. 754,078. Patented March 8, 1904.

UNITED STATES PATENT OFFICE.

GEORGE A. LUDINGTON, OF AKRON, OHIO, ASSIGNOR TO FIRESTONE TIRE & RUBBER COMPANY, OF AKRON, OHIO, A CORPORATION OF WEST VIRGINIA.

METHOD OF VULCANIZING TIRES IN CONTINUOUS LENGTHS.

SPECIFICATION forming part of Letters Patent No. 754,078, dated March 8, 1904.

Application filed January 2, 1904. Serial No. 187,516. (No model.)

*To all whom it may concern:*

Be it known that I, GEORGE A. LUDINGTON, a citizen of the United States, residing at Akron, in the county of Summit and State of Ohio, have invented a certain new and Improved Method of Vulcanizing Tires in Continuous Lengths, of which the following is a specification.

My invention relates to the manufacture of rubber tires for vehicles. Heretofore in the manufacture of such tires they have usually been molded and vulcanized and supplied to the trade in a considerable variety of stock lengths adapted to wheels of varying diameters. This practice has necessitated on the part of the dealer the carrying of a very large stock in order to have constantly on hand a sufficient supply of all the various lengths likely to be called for, thus requiring a considerable outlay of capital and a considerable amount of storage space to accommodate the large stock necessitated by the demands of retail trade.

My invention has for its primary object to obviate these objectionable conditions; and this object it accomplishes through a novel method or process of manufacture of this class of goods whereby they are enabled to be supplied to the dealers in continuous lengths conveniently put up in coil form on reels or like devices from which tires of the exact length required by incoming orders can be cut off and supplied.

Briefly stated, the manufacture of such tires in continuous lengths is carried out by my present invention through a series of steps or operations which consists, first, in vulcanizing a certain length of raw molded tire stock, leaving one end thereof exposed and unvulcanized, then splicing to said raw or unvulcanized end of the first length treated a second length of raw molded tire stock, then vulcanizing the joint thus formed and all of the second section excepting its free end portion, then splicing a third unvulcanized section to the latter and continuing such series of operations until a continuous length or coil of any suitable or convenient amount has been produced.

In order that my invention may be fully and clearly understood, I have illustrated in the accompanying drawings one out of a great number and variety of means for carrying the same into effect, the means herein shown consisting of a steam-heated vulcanizing-mold of practically a form and construction such as has been extensively used in the manufacture of tires in stock lengths with some additions thereto, better adapting it to the carrying out of the present invention to secure the most perfect results, and referring thereto—

Figure 2:
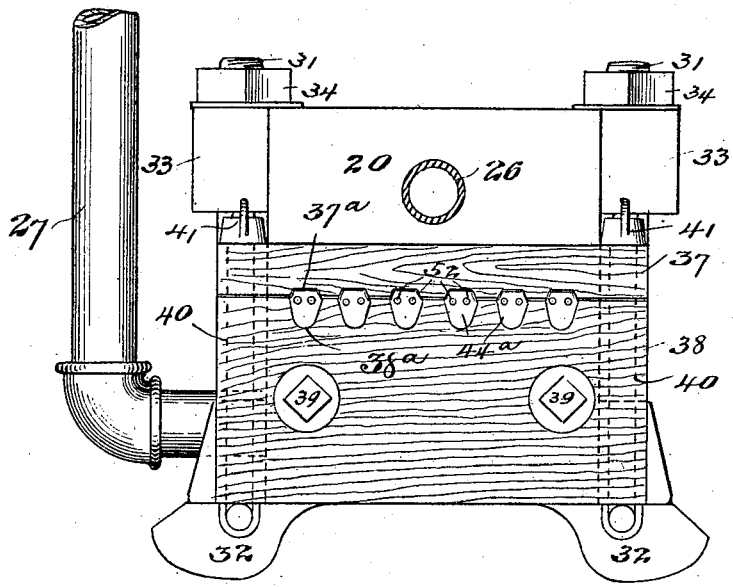
Figure 3:
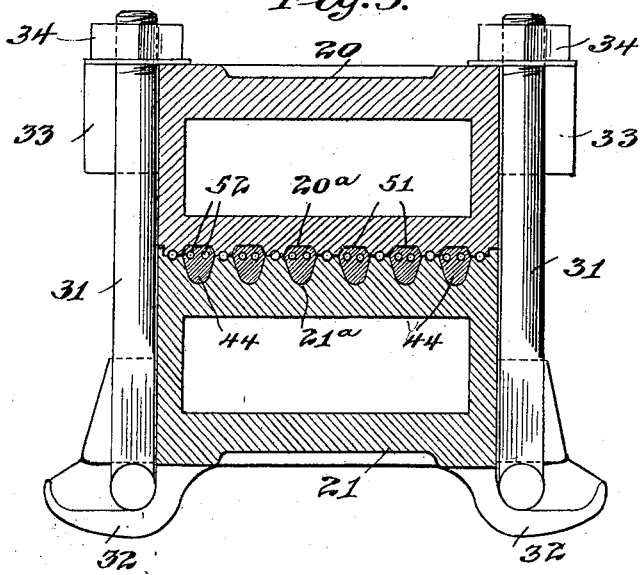

Figure 1 is a side elevational view of the mold complete. Fig. 2 is an end view thereof on an enlarged scale. Fig. 3 is a transverse sectional view. Fig. 4 is a detail top plan view of one end portion thereof. Fig. 5 is a side elevational view of Fig. 4. Fig. 6 is a longitudinal sectional view of so much of the mold as is shown in Figs. 4 and 5. Figs. 7 to 12, inclusive, are detail views illustrating one manner of splicing the unvulcanized ends of two successive sections of tire. Figs. 13 and 14 illustrate another method of effecting such splicing operation, and Fig. 15 illustrates still another form of joint which is capable of being employed in the carrying out of the invention.

Describing first briefly the particular apparatus herein shown as constituting one instrumentality through which my invention may be carred out in practice, 20 and 21 designate the upper and lower sections, respectively, of a vulcanizing-mold of that type wherein the mold members are cored for the reception of superheated steam to effect the required heating, said mold being supported on suitable pedestals 22. A steam-inlet pipe 23, provided with a cut-off valve 24 and a pressure-gage 25, communicates with the chambers of the upper and lower sections through flexible hose connections 26 and 27, respectively. Similar valved flexible hose connections 28 and 29 connect the opposite end of the mold-sections with a steam-discharge pipe 30. The meeting faces of the mold-sections are provided with longitudinal grooves $20^a$ and $21^a$, respectively, so disposed that the series of grooves in one face registers perfectly with the series of grooves in the other when the mold-sections are united, each pair of upper and lower grooves together forming the outline of the tire to be vulcanized therein. The mold-sections are, as herein shown, united by a series of bolts 31, hinged at their lower ends in ears 32, projecting from the lower margins of the mold-section 21, and when in operative position lying between lugs 33, projecting laterally from the upper mold-section 20, and screw-threaded at their outer ends to receive clamping-nuts 34. The perfect registration of the mold-sections is insured by vertical dowel-pins 35 on one of the sections entering suitable sockets 36 in longitudinal alinement therewith on the other.

On one or both ends of the vulcanizing-mold is secured an auxiliary mold, consisting of upper and lower sections 37 and 38, respectively, the inner or meeting faces of which are provided with registering grooves $37^a$ and $38^a$, corresponding in form and size and arranged in longitudinal alinement with the grooves $20^a$ and $21^a$, respectively, of the vulcanizing-mold. The function of these auxiliary molds is to support the projecting ends of the tire-sections while the latter are undergoing the curing operation and prevent deformation of the same, owing to the compressive action of the main mold-sections. For the purposes of carrying out the present invention the auxiliary mold-sections may be made of wood or any other suitable material, the lower section 38 being united to the end of the main mold-section 21 by screw-threaded bolts 39 and the two sections being removably united by hinge-bolts 40, provided with clamping thumb-nuts 41 on their upper ends. The upper mold-section 20 may be removably connected to a suitable hoisting-tackle 42 by a chain 43, the steam-conducting hose-sections 26 and 28 being of sufficient length and flexibility to permit the upper mold-section 20 to be raised and swung to one side in emptying or charging the mold.

In carrying out my invention in connection with a vulcanizer such as that hereinabove described I first take a series of uncured molded tire-sections 44 and lay them in the grooves $21^a$, with one end portion $44^a$ thereof lying in the grooves $38^a$ of the auxiliary support at one end of the vulcanizer, and I then apply and secure in operative position the upper mold-sections 20 and 37. Steam is then turned on through the pipe 23 and hose-sections 26 and 27 to the cores of the vulcanizer-sections for the required time, whereby the tire-sections are vulcanized with the exception of the projecting end portions lying in the supporting-mold at the end of the vulcanizer. I then remove the upper sections 20 and 37 and splice onto the uncured ends $44^a$ fresh sections of molded uncured tire stock. In Figs. 7 to 15, inclusive, I have illustrated some ways in which this splicing may be effectively performed. Figs. 7 to 12, inclusive, represent the preferred method of splicing, wherein $44^a$ designates the uncured end portion of one of the first sections to be vulcanized, and 44' designates the end of the second section to be joined thereto. These meeting end portions are first split horizontally inward for some distance, as indicated at 45 and 46, respectively, after which I take a short strip of canvas 47, Figs. 11 and 12, and having coated the same thoroughly with an adhesive rubber cement I insert the same to about one-half its length in one of the slits 45 or 46, and then having freshly applied the cement to the meeting surfaces of the slits and to the end surfaces of the tire-sections, as indicated at 48 in Fig. 8, I insert the projecting end of the canvas strip 47 into the slit of the other tire-section, at the same time bringing said sections into square endwise abutting relation. I then advance the spliced sections through the mold until the spliced joints and all but the free end portions of the fresh sections lie within the longitudinal limits of the vulcanizer, said free end portions lying on the supporting mold-section 38, and I then apply the covering-sections 20 and 37, turn on the steam, and effect a second vulcanization. This latter operation not only vulcanizes the second series of tire-sections, but also thoroughly vulcanizes the joint or spliced parts, connecting them to the sections vulcanized by the previous operation, so that the two series of sections constitute continuous sections of vulcanized tire stock. This done, I again open the vulcanizer, splicing on a third series of fresh uncured sections, and repeat these operations in the order hereinabove described until the desired continuous length of vulcanized tire stock is obtained.

When splicing the connecting ends of successive sections after the manner illustrated in Figs. 13 and 14, I form in one of the sections—$44^a$, for instance—a V-shaped recess 47', and on the connecting end of the next succeeding section 44' I form a tongue 48', corresponding in dimensions and shape to the recess 47', and having covered the same thoroughly with cement I bring them together and subsequently vulcanize the joint simultaneously with the vulcanization of the second section or series of sections, all as above described.

Fig. 15 illustrates still another form of splice, wherein the meeting ends of the sections $44^a$ and 44' are cut to provide upper and lower overlapping sections 49 and 50, respectively, which are treated to cement, brought together, and vulcanized.

While I have illustrated and described several ways in which this splicing may be effected, my present invention is not concerned with any particular means or manner of forming such spliced joint, such splicing, however performed, constituting simply one step or operation in my improved method of vulcanizing tires in continuous lengths.

In the manufacture of vehicle-tires of this character such tires are commonly provided on their rim-engaging surface or surfaces with a canvas covering or base. When this canvas base is employed in the manufacture of the tire, I employ a continuous length thereof, applying the same to the first section to be vulcanized as it goes into the vulcanizing-mold, but without severing it, and when the second section is spliced on I simply continue the application of the canvas backing over the spliced joint and the second section, vulcanizing it to said joint and section in the second vulcanizing operation, again continuing its application over the second spliced joint and third section, and so on over the successive joints and sections as the building up of the continuous tire length proceeds. This canvas base is indicated in Figs. 3, 9, 11, 14, and 15 at 51, Figs. 9, 14, and 15 clearly illustrating the covering of the spliced joint by the continuous length of friction-tape or canvas strip constituting the fibrous base or backing.

Where one or more internal fastening-wires are used in solid-rubber tires to secure the latter to the wheels of vehicles, such tires are commonly molded and vulcanized about one or more mandrels extending longitudinally therethrough for the purpose of forming in the tire the necessary hole or holes for the subsequent insertion and accommodation of the fastening wire or wires. My invention is capable of successful employment in the manufacture of such cored tires, the steps or operations of manufacture of such tires in continuous lengths according to my invention being substantially the same as hereinabove described in connection with solid tires. In addition to or in association with the operations already described I first vulcanize the initial section of each continuous tire on one or more mandrels, (indicated at 52.) When this section has been vulcanized, I then withdraw said mandrel or mandrels, then splicing a fresh section containing one or more mandrels to the unvulcanized end portion of said initial section and simultaneously inserting the end of said last-named mandrel or mandrels into and through said unvulcanized end portion so that the mandrel or mandrels extend entirely through the spliced or jointed portion of the tire while the latter is being vulcanized in connection with the heated uncured section, repeating these operations in connection with the addition of each fresh length of uncured stock, the final result being a body of tire stock of any desired length, according to the number of successive additions, the whole being continuous, uninterrupted, and uniform throughout from end to end and cored for the insertion of the fastening wire or wires.

Tire stock manufactured in accordance with the invention hereinabove described is conveniently wound up on reels or in coils and shipped to the retail trade, the great advantage thereof being that as tires of varying lengths are called for the exact lengths can readily be cut from the continuous coil and applied, thus eliminating all waste and obviating the necessity of a dealer having on hand constantly a large supply of the numerous stock lengths in which these tires are now put upon the market. I have repeatedly demonstrated by actual experience that where the joints are well made and thoroughly vulcanized they are practically invisible in the final product and so far from constituting weak spots in the tire possess a durability, resistance to separation, and general wearing capacity fully equal to if not greater than any other points or parts of the tire.

While I have herein shown and described an apparatus well adapted for the carrying out of the invention, it will be understood that my novel method of tire manufacture is capable of being carried out through the agency of any form or style of vulcanizer which will permit the tire to be advanced longitudinally therethrough at each succeeding vulcanizing operation, the novelty of my invention residing in a series of acts or operations performed in a certain order upon the molded tire stock in connection with the vulcanization thereof, whereby there is produced a continuous, homogeneous, and uniform length of manufactured tire from which may be cut individual tire-sections of the required or desired lengths.

I claim—

1. A method of vulcanizing rubber tires in continuous lengths which consists in first vulcanizing all but an end portion of a given section, then splicing a second section to the unvulcanized end of said first section, and then subjecting the spliced unvulcanized end portion of the first section and said second section to the vulcanizing operation, substantially as described.

2. A method of vulcanizing rubber tires in continuous lengths which consists in first vulcanizing all but an end portion of a given section, then splicing a second section to the unvulcanized end of said first section, then vulcanizing the spliced unvulcanized end of said first section and all but the free end of said second section, and then splicing and vulcanizing successive sections in the manner and sequence above defined until the desired continuous length of vulcanized tire stock is obtained, substantially as described.

3. A method of vulcanizing rubber tires in continuous lengths by the action of heat and pressure in a mold, which consists in first vulcanizing all but an end portion of a given section, then splicing a second section to the unvulcanized end of said first section, then advancing the tire through the mold until the spliced joint and all but the free end portion of said second section are covered by the mold, then vulcanizing said parts contained in the mold, and continuing said operations in the order named until the desired continuous length of vulcanized tire stock is obtained, substantially as described.

4. A method of vulcanizing rubber tires in continuous lengths by the action of heat and pressure in a mold, which consists in first vulcanizing all but a projecting end portion of a given section and simultaneously supporting and protecting said projecting end portion against deformation and heat action during said vulcanizing operation, then splicing a second section to the unvulcanized end of said first section, then advancing the tire through the mold until said spliced projecting end portion and all but the free end portion of said second section are covered by the mold, then vulcanizing said parts and simultaneously supporting and protecting said free end portion against deformation and heat action and repeating said operations in the order named until the desired continuous length of vulcanized tire stock is obtained, substantially as described.

5. A method of vulcanizing cored rubber tires in continuous lengths, which consists in first vulcanizing all but an end portion of a given section on a mandrel, then withdrawing said mandrel, then splicing a fresh section containing a mandrel to the unvulcanized end portion of said first section and simultaneously inserting the end of said last-named mandrel into and through said unvulcanized end portion, and then vulcanizing said spliced end portion and said fresh section, substantially as described.

6. A method of vulcanizing cored rubber tires in continuous lengths by the action of heat and pressure in a mold, which consists in first vulcanizing all but a projecting end portion of a given section on a mandrel and simultaneously supporting and protecting said projecting end portion against deformation and heat action during said vulcanizing operation, then withdrawing said mandrel, then splicing a second section containing a mandrel to the unvulcanized end portion of said first section and simultaneously inserting the end of said last-named mandrel into and through said unvulcanized end portion, then advancing the tire through the mold until said spliced projecting end portion and all but the free end portion of said second section are covered by the mold, then vulcanizing said parts and simultaneously supporting and protecting said free end portion against deformation and heat action, and repeating said operations in the sequence named until the desired continuous length of vulcanized cored tire stock is obtained, substantially as described.

GEORGE A. LUDINGTON.

Witnesses:
 JOS. S. BENNER,
 E. O. HOOPINGARNER.